United States Patent [19]

Kanda

[11] Patent Number: 5,690,320
[45] Date of Patent: Nov. 25, 1997

[54] FLUID-FILLED DAMPING DEVICE HAVING A LARGE SPRING STIFFNESS VALUES IN TWO MUTUALLY PERPENDICULAR DIAMETRIC DIRECTIONS

[75] Inventor: Ryouji Kanda, Komaki, Japan

[73] Assignee: Tokai Rubber Industries, LTD., Japan

[21] Appl. No.: 664,004

[22] Filed: Jun. 14, 1996

[30] Foreign Application Priority Data

Jun. 23, 1995 [JP] Japan .................................. 7-158089

[51] Int. Cl.$^6$ .................................................. F16M 1/00
[52] U.S. Cl. .................................. 267/140.12; 267/140.5
[58] Field of Search ........................... 267/140.5, 140.11, 267/140.12, 140.13, 141.1, 141.4, 219; 180/300, 312, 902; 248/562, 636

[56] References Cited

U.S. PATENT DOCUMENTS

| 4,702,346 | 10/1987 | Uno et al. ............... 267/140.12 X |
| 4,741,521 | 5/1988 | Schiffner et al. ............ 267/140.12 |
| 4,756,514 | 7/1988 | Kanda ........................ 267/140.12 |
| 4,936,556 | 6/1990 | Makibayashi et al. ........ 267/140.13 |
| 5,005,810 | 4/1991 | Sawada et al. .............. 267/140.13 |
| 5,595,373 | 1/1997 | Ikeda ..................... 267/140.12 X |

FOREIGN PATENT DOCUMENTS

| 0 044 908 | 2/1982 | European Pat. Off. . |
| 0 262 840 A2 | 4/1988 | European Pat. Off. . |
| 0 278 801 | 8/1988 | European Pat. Off. . |
| 0 452 169 A1 | 10/1991 | European Pat. Off. . |
| A2 593 255 | 7/1987 | France . |
| 37 30 582 A1 | 3/1989 | Germany . |
| 2-6935 | 2/1990 | Japan . |

OTHER PUBLICATIONS

Patent Abstracts Of Japan, vol. 8, No. 140 (M-305), Jun. 29, 1984 & JP-A-59 037349 (Toukai Gomu Kogyo KK), Feb. 29, 1984.
Patent Abstracts Of Japan, vol. 10, No. 372 (M-544) (2429), Dec. 11, 1986 & JP-A-61 165040 (Tokai Rubber Ind. Ltd), Jul. 25, 1986.
Patent Abstracts Of Japan, vol. 10, No. 346 (M-537) (2402), Nov. 21, 1986 & JP-A-61 144444 (Tokai Rubber Ind. Ltd), Jul. 2, 1986.
Patent Abstracts Of Japan, vol. 18, No. 59 (M-1552), Jan. 31, 1994 & JP-A-05 280583 (Kinugawa Rubber Ind Co. Ltd), Oct. 26, 1993.

*Primary Examiner*—Josie Ballato
*Attorney, Agent, or Firm*—Parkhurst, Wendel & Burr, L.L.P

[57] ABSTRACT

A fluid-filled damping device wherein a center shaft member and an outer cylindrical member are elastically connected by first and second elastic end walls and an elastic intermediate wall interposed between the end walls. The first elastic end wall has two recesses opposed to each other in a first diametric direction of the center shaft member, and cooperates with the elastic intermediate wall and the outer cylindrical member to define a first fluid chamber. The intermediate wall cooperates with the second elastic end wall and two partition blocks to define a first and a second pocket which are opposed to each other in the first diametric direction. The two partition blocks are interposed between the intermediate and second end walls and opposed to each other in a second diametric direction perpendicular to the first diametric direction. The two pockets are closed by the outer cylindrical member to provide a second and a third fluid chambers communicating with the first fluid chamber.

15 Claims, 4 Drawing Sheets

FLUID-FILLED DAMPING DEVICE HAVING A LARGE SPRING STIFFNESS VALUES IN TWO MUTUALLY PERPENDICULAR DIAMETRIC DIRECTIONS

BACKGROUND OF THE INVENTION

1. Field of the Invention

The present invention generally relates to a generally cylindrical fluid-filled damping device which is capable of exhibiting a damping effect with respect to a vibrational load received primarily in its axial direction, based on flows of a non-compressible fluid between fluid chambers filled with the fluid. More particularly, the present invention is concerned with such a fluid-filled damping device which has different spring stiffness values (different spring characteristics) in its two mutually perpendicular diametric directions.

2. Discussion of the Prior Art

As one type of an elastic mount or vibration damper interposed between two members of a vibration system so as to elastically connect or support the two members in a vibration damping manner, there is known a cylindrical fluid-filled damping device as disclosed in JP-B-2-6935 (laid-open publication of examined Japanese Patent Application), wherein a center shaft member and an outer cylindrical member are disposed in a radially spaced-apart relation with each other and are elastically connected to each other at the opposite axial ends thereof by substantially annular first and second elastic end walls, respectively. The damping device further has an elastic intermediate wall which is formed independently of and between the first and second elastic end walls. The elastic intermediate wall cooperates with the first and second elastic end walls to define a pair of fluid chambers on the opposite sides of the elastic intermediate wall. The fluid chambers are filled with a suitable non-compressible fluid such as water, and are held in communication with each other by a restricted fluid passage or an orifice. The damping device is adapted to exhibit a damping effect with respect to a vibrational load primarily received in its axial direction, on the basis of resonance of the fluid which is forced to flow between the pair of fluid chambers through the orifice. Such a cylindrical fluid-filled damping device is suitably used as a body mount, a member mount, a sub-frame mount, a cab mount, or a suspension mount such as a strut bar cushion.

The known fluid-filled damping device constructed as described above is required to provide different spring stiffness values in its two mutually perpendicular diametric directions so that these two spring stiffness values have a relatively large ratio in the two diametric directions, for the purpose of improving the driving comfort of the vehicle as well as enhancing the steering stability of the vehicle. To meet this requirement in the damping device disclosed in the above-identified publication, one of the two fluid chambers which is formed between the first elastic end wall and the elastic intermediate wall is adapted to function as an annular first fluid chamber which is continuous in the circumferential direction of the damping device, while the other fluid chamber formed between the elastic intermediate wall and the second elastic end wall is divided into two circumferential sections, i.e., a second and a third fluid chamber by a pair of partition walls. Described more specifically, the elastic intermediate wall and the second elastic end wall have diametrically opposite portions superposed on each other in the axial direction, so as to provide the pair of diametrically opposite partition walls having a relatively large axial dimension. According to this arrangement, the damping device has a comparatively low spring stiffness in a first diametric direction in which the second and third fluid chambers are opposed to each other, and has a comparatively high spring stiffness in a second diametric direction in which the pair of the partition rubber walls are opposed to each other and which is perpendicular to the first diametric direction.

In the known fluid-filled damping device constructed as described above, however, it is still difficult to provide a sufficiently large ratio of the spring stiffness values in the two mutually perpendicular diametric directions, namely, in the first and second diametric directions indicated above.

When the elastic intermediate wall and second elastic end wall are elastically deformed upon application of a vibrational load to the thus constructed damping device, gaps are apt to be created between the contacting surfaces of the elastic intermediate wall and the second elastic end wall which cooperate to provide the diametrically opposite partition walls. Accordingly, the second and third fluid chambers may communicate with each other through these gaps, undesirably changing the damping characteristic of the damping device with respect to the vibrations received in its axial and diametric directions. As a result, the damping device may not exhibit the desired damping characteristics with high stability.

Further, the known damping device tends to suffer from abnormal noise which is generated due to abutting or frictional contact between the surfaces of the elastic intermediate wall and the second elastic end wall of the partition walls.

SUMMARY OF THE INVENTION

It is therefore an object of the present invention to provide an improved fluid-filled damping device which provides a sufficiently large ratio of spring stiffness values in its two mutually perpendicular diametric directions with a relatively simple structure.

It is an optional object of the invention to provide such a fluid-filled damping device which is simple in construction and economical to manufacture and which exhibits a damping effect with high stability while avoiding gaps in the partition walls which define the second and third fluid chambers between the elastic intermediate wall and the second elastic end wall.

The above objects may be achieved according to a principle of the present invention which provides a fluid-filled damping device comprising: (a) a center shaft member; (b) an outer cylindrical member disposed radially outwardly of the center shaft member; (c) a first and a second elastic end wall each having a generally annular shape, for elastically connecting the center shaft member and the outer cylindrical member at axially opposite end portions thereof, the first elastic end wall having a pair of recesses which are opposed to each other in a first diametric direction of the center shaft member; (d) a generally annular elastic intermediate wall disposed between the first and second elastic end walls and cooperating with the first elastic end wall to define an annular void between the first elastic end wall and the elastic intermediate wall; (e) a pair of partition blocks which are disposed between the second elastic end wall and the elastic intermediate wall such that the partition blocks are opposed to each other in a second diametric direction perpendicular to the first diametric direction, the partition blocks cooperating with the second elastic end wall and the elastic intermediate wall to define a first pocket and a second pocket which are opposed to each other in the first dimmetric direction, the elastic intermediate wall, the second elastic end wall and the partition blocks being formed as an integral structure separate from the first elastic end wall, the integral structure being secured at an inner circumferential surface thereof to the center shaft member; (f) a first intermediate sleeve fitted on an outer circumferential surface of the integral structure, the first intermediate sleeve having a pair of windows through which the first and second pockets are open, the outer cylindrical member being fitted on the first intermediate sleeve such that the outer cylindrical member closes the annular void, thereby cooperating with the first elastic end wall to define a first fluid chamber, and also closes the pair of windows, thereby cooperating with the elastic intermediate wall, the second elastic end wall and the partition blocks to define a second and a third fluid chamber which correspond to the first and second pockets, respectively, the first, second and third fluid chambers being filled with a non-compressible fluid; and (g) means for defining a first orifice for fluid communication between the first and second fluid chambers and a second orifice for fluid communication between the first and third fluid chambers.

In the fluid-filled damping device constructed according to the present invention, the first elastic end wall has the pair of recesses which are opposed to each other in the first diametric direction perpendicular to the second diametric direction in which the pair of partition blocks that partially define the second and third fluid chambers are opposed to each other. In this arrangement, the first elastic end wall has a comparatively low spring stiffness in the first diametric direction in which the recesses are opposed to each other. Thus, the present device provides a sufficiently large ratio of the spring stiffness values in its mutually perpendicular diametric directions, namely, in the first and second diametric directions. Further, the pair of recesses are open to the first fluid chamber, whereby the first fluid chamber has a relatively large volume, that is, a relatively large volume of the fluid is contained in the first fluid chamber.

The first axial end wall of the present fluid-filled damping device is prepared separately from an integral structure consisting of the elastic intermediate wall, second elastic end wall and partition blocks. This arrangement permits easy formation of the pair of recesses in the first elastic end wall, without a considerable increase in the number of the required components of the device and in the structural complexity of the device.

In the present device, the partition blocks which partially define the second and third fluid chambers are formed integrally with the elastic intermediate wall and second elastic end wall so as to provide the integral elastic structure. This arrangement eliminates the conventionally experienced problem that gaps are created between the mutually abutting surfaces of the partition blocks, second elastic end wall and elastic intermediate wall upon application of the vibrational load to the device. As a result, the second and third fluid chambers are highly fluid-tightly separated from each other with high stability, so that the present device stably and effectively exhibits the desired damping characteristics while preventing generation of abnormal noise which would arise from the presence of the above-indicated gaps between the abutting surfaces of the partition blocks, second elastic end wall and elastic intermediate wall.

In the present invention, the integral structure consisting of the elastic intermediate wall, second elastic end wall and partition blocks may be directly secured to the center shaft member in a process of vulcanization of rubber materials to form those walls and blocks. In a first preferred form of the invention, however, the first elastic end wall is directly secured at its inner circumferential surface to the center shaft member, while the integral structure is secured to a fixing sleeve which is fitted on an circumferential surface of the center shaft member.

The fluid-filled damping device constructed according to the first preferred form of the invention assures easy assembling of the integral structure and the center shaft member. The integral structure which consists of the elastic intermediate wall, second elastic end wall and partition blocks is prepared separately from the first elastic end wall.

In the present invention, the first and second orifices may be formed through the elastic intermediate wall in its axial direction. Alternatively, these orifices may be formed on the outer circumferential surface of the center shaft member. In a second preferred form of the invention, however, the fluid-filled damping device uses an orifice member disposed between the first intermediate sleeve and the outer cylindrical member, for defining the first and second orifices.

The fluid-filled damping device constructed according to the second preferred form of the invention permits easy formation of the orifices having sufficient lengths, to thereby assure easy tuning or adjustment of the damping characteristics of the device.

In the present invention, the first and second elastic end walls and the elastic intermediate wall may be interposed between the center shaft member and outer cylindrical member in the radial direction. In a third preferred form of the invention, however, the fluid-filled damping device further comprises a metal flange member attached to one of opposite axial ends of the center shaft member so as to extend radially outwardly of the center shaft member, and a second intermediate sleeve secured to an outer circumferential surface of the first elastic end wall and having an outward flange formed on one of opposite axial ends thereof so as to extend radially outwardly. The first elastic end wall is interposed between the flange member and the outward flange of the second intermediate sleeve as seen in an axial direction of the center shaft member. The second elastic end wall has a smaller axial length for permitting a larger amount of elastic deformation thereof in the axial direction than the first elastic end wall and the elastic intermediate wall.

The fluid-filled damping device constructed according to the third preferred form of the invention exhibits a high damping effect with respect to a vibrational load received in its axial direction, owing to a sufficiently large amounts of flow of the fluid through the first and second orifices, which may be effectively induced by relative pressure changes between the first and second fluid chambers and between the first and third fluid chambers. Thus, the present device is capable of exhibiting improved damping characteristics based on the fluid flows through those orifices.

In the present invention, the second intermediate sleeve may function as the outer cylindrical member. In a fourth preferred form of the invention, however, the outer cylindrical member is fitted on an outer circumferential surface of the second metal sleeve.

In the fluid-filled damping device constructed according to the fourth preferred form of the invention, the outer cylindrical member is fitted on the outer circumferential surfaces of the first and second intermediate sleeves, such that the opening of the annular void formed between the first elastic end wall and the elastic intermediate wall is closed by the outer cylindrical member so as to provide the first fluid chamber. Thus, the first fluid chamber is formed with a relatively simple structure when the second and third fluid chambers are formed.

According to a fifth preferred form of the invention, the fluid-filled device comprises a third orifice which permits direct fluid communication between the second and third fluid chambers, rather than indirect communication through the first fluid chamber and the first and second orifices.

The fluid-filled damping device constructed according to the fifth preferred form of the invention exhibits effective damping characteristics with respect to the vibrations applied in the first diametric direction (in which the second and third fluid chambers are opposed to each other), on the basis of the fluid flows through the third orifice.

According to a sixth preferred form of the invention, the elastic intermediate wall has a radial dimension which is smaller than that of the first elastic end wall.

When the axial vibrations are applied to the device constructed according to the sixth preferred form of the invention, the relative fluid pressure changes are effectively induced between the first and second fluid chambers and between the first and third fluid chambers, to thereby increase the amounts of flow of the fluid through the first and second orifices so that the device exhibits an improved damping effect based on the fluid flows through those orifices.

BRIEF DESCRIPTION OF THE DRAWINGS

The above and optional objects, features, advantages and technical significance of the present invention will be better understood by reading the following detailed description of presently preferred embodiments of the invention, when considered in connection with the accompanying drawings in which.

DETAILED DESCRIPTION OF THE PREFERRED EMBODIMENT

Figure 1:
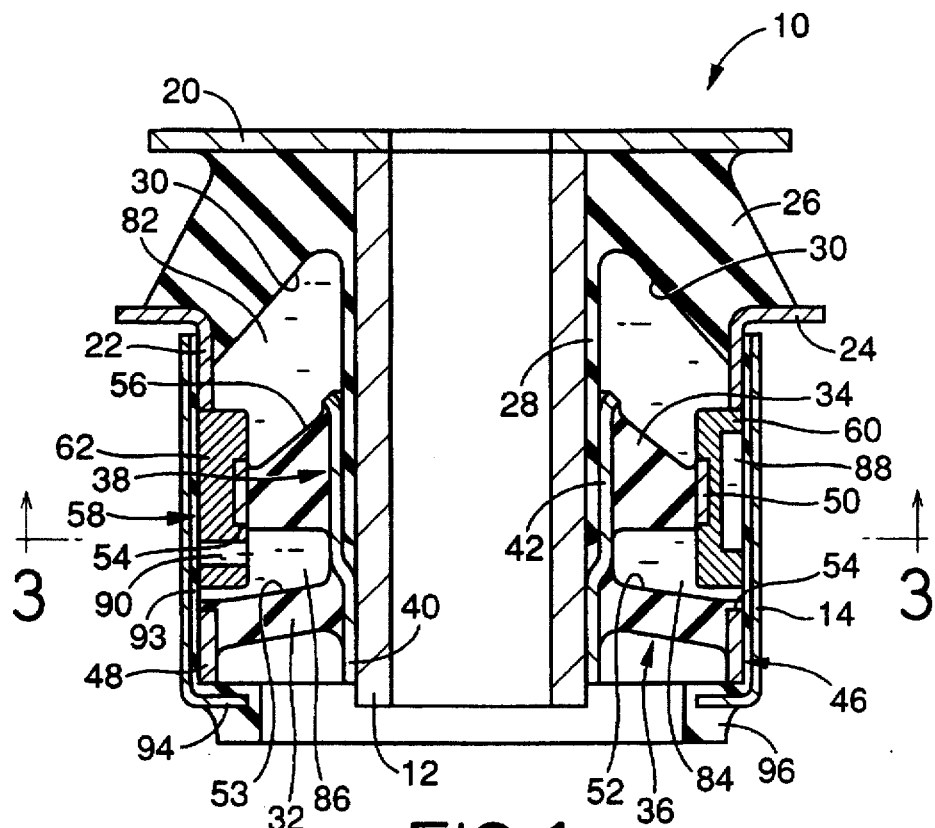
FIG. 1 is an elevational view in axial cross section of one embodiment of a fluid-filled damping device of the present invention in the form of a vehicle member mount, the view being taken along line 1—1 of FIG. 3.
Figure 2:
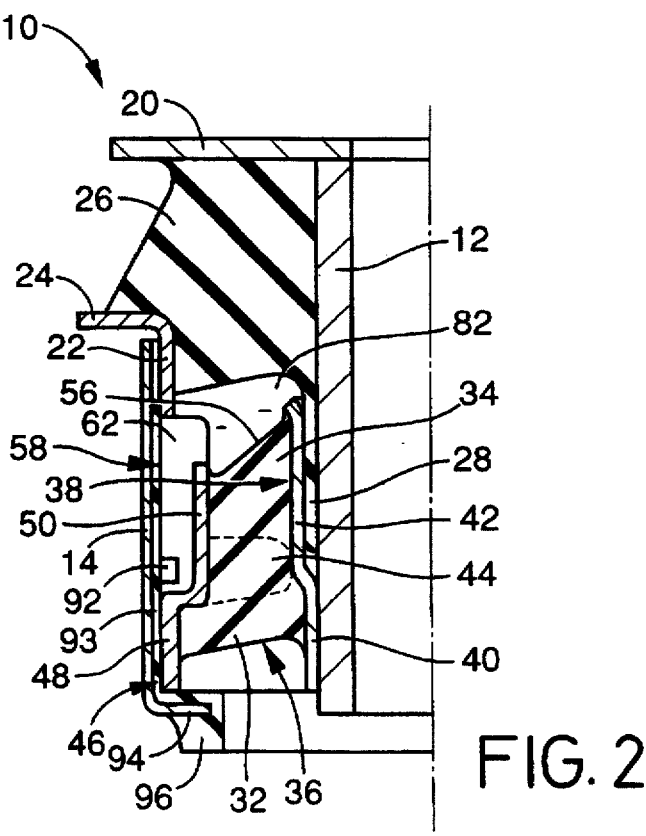
FIG. 2 is an elevational view in axial cross section corresponding to that of FIG. 1, the view being taken along line 2—2 of FIG. 3.
Figure 3:
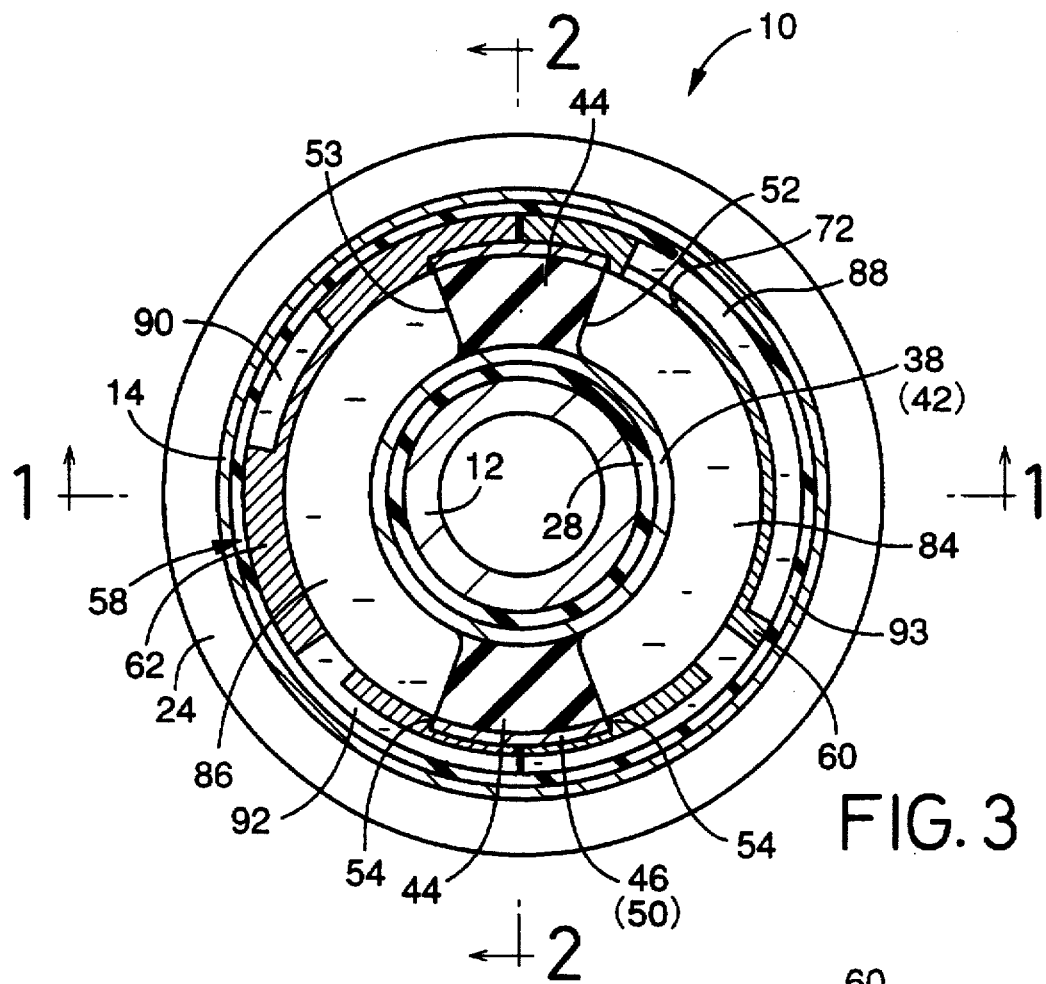
FIG. 3 is a transverse cross sectional view taken along line 3—3 of FIG. 1.

Referring first to FIGS. 1 through 3, there is shown a fluid-filled damping device in the form of a member mount 10 used for a motor vehicle, which is constructed according to one embodiment of the present invention. The member mount 10 includes a center shaft member in the form of an inner sleeve 12 and an outer cylindrical member in the form of an outer sleeve 14. The inner and outer sleeves 12, 14 are made of metal and disposed in a radially spaced-apart relation with each other with a suitable radial distance therebetween. Between these inner and outer sleeves 12, 14, there is disposed an elastic body made of a rubber material for elastically connecting the two sleeves 12, 14 to each other. The vehicle member mount 10 is installed in position on the motor vehicle such that the outer sleeve 14 is fixed or press-fitted in a mounting hole formed in a selected member (e.g., a side member) of the vehicle, while the inner sleeve 12 is bolted to the body of the vehicle. Thus, the selected member of the vehicle is elastically connected to or supported by the vehicle body by the member mount 10. With the member mount 10 installed on the vehicle, a vibrational load is applied between the inner and outer sleeves 12, 14, primarily in the axial direction of the member mount 10. That is, the member mount 10 is adapted to effectively damp a vibrational load applied thereto in its axial direction (i.e., in the vertical direction as seen in FIG. 1).

More specifically described, the inner sleeve 12 is a cylindrical member having a relatively large wall thickness. To one of the opposite axial ends of the inner sleeve 12, there is attached by welding a disk-like metal flange member 20 which extends in the radially outward direction of the inner sleeve 12. A first intermediate sleeve 46 and a second intermediate sleeve 22 are interposed between the inner and outer sleeves 12, 14 such that the two intermediate sleeves 46, 22 are spaced apart from each other in the axial direction, as shown in FIGS. 1 and 2. The second intermediate sleeve 22 is disposed nearer to the flange member 20 and is spaced radially outwardly from the inner sleeve 12 with a predetermined radial distance therebetween, in substantially coaxial relation with each other. The second intermediate sleeve 22 is a cylindrical member having an outward flange 24 integrally formed at one of its opposite axial ends which is remote from the first intermediate sleeve 46. The outward flange 24 extends in the radially outward direction. Between the mutually radially opposed circumferential surfaces of the inner sleeve 12 and the second intermediate sleeve 22 and between the mutually axially opposed surfaces of the flange member 20 and the outward flange 24, there is formed a first elastic end wall 26 made of a rubber material and having a generally annular shape with relatively large axial and radial dimensions. The first elastic end wall 26 is bonded to the inner sleeve 12 and the second intermediate member 22 during a process of vulcanization of the rubber material to form the first elastic end wall 26. On the outer circumferential surface of the inner sleeve 12, there is provided a relatively thin sealing rubber layer 28 which extends from the radially inner portion of the first elastic end wall 26 over a suitable length in the axial direction away from the flange member 20.

The first elastic end wall 26 has a pair of recesses 30, 30 formed so as to be open in its axial end face on the side of the sealing rubber layer 28, such that these recesses 30, 30 are opposed to each other in a first diametric direction of the inner sleeve 12. In this arrangement, the first elastic end wall 26 extends between the mutually opposed circumferential surfaces of the inner sleeve 12 and the second intermediate sleeve 22, as indicated in FIG. 2, at diametrically opposite circumferential portions thereof which are opposed to each other in a second diametric direction perpendicular to the above-identified first diametric direction in which the recesses 30, 30 are opposed to each other, as shown in FIG. 1. In the presence of the recesses 30, 30, a pair of circumferential tapered portions are provided in the first elastic end wall 26. Each of these tapered portions has a tapered shape as seen in the cross sectional view of FIG. 1, such that each tapered portion of the first elastic end wall 26 extends radially outwards as it extends in the axial direction from the flange member 20 secured to the inner sleeve 12 toward the outward flange 24 of the second intermediate sleeve 22, as shown in FIG. 1. The inner surfaces of these tapered portions are defined by the respective recesses 30, 30 and are opposed to each other in the first diametric direction indicated above. Thus, substantially no portions of the first elastic end wall 26 are present between the areas of the circumferential surfaces of the sleeves 12 and sleeve 22 which are opposed to each other in the first diametric direction. According to this arrangement, the first elastic end wall 26 has a relatively low spring stiffness or a relatively soft spring characteristic in the above-indicated first diametric direction in which the pair of recesses 30, 30 are opposed to each other, and has a relatively high spring stiffness or a relatively hard spring characteristic in the above-indicated second diametric direction perpendicular to the first diametric direction.

On the axial end portion of the inner sleeve 12 remote from the flange member 20, there is fitted an integrally formed intermediate product 36 including a second elastic end wall 32 and an elastic intermediate wall 34. This intermediate product 36 is prepared in the process of vulcanization of the rubber material to form the walls 32, 34. The second elastic end wall 32 is an annular member having a smaller axial length than the first elastic end wall 26 and is more likely to be elastically deformed in its axial direction than the first elastic end wall 26. On the other hand, the elastic intermediate wall 34 is an annular member having a larger axial length than the second elastic end wall 32. The second elastic end wall 32 and elastic intermediate wall 34 are disposed in an axially spaced-apart relation with each other with a suitable axial distance therebetween, and are secured at the respective inner circumferential surfaces to the outer circumferential surface of a fixing sleeve 38. Described more specifically, this fixing sleeve 38 has a shoulder at an axially intermediate portion thereof, and includes a small-diameter portion 40 on the lower side of the shoulder and a large-diameter portion 42 on the upper side of the shoulder, as seen in FIGS. 1 and 2. The second elastic end wall 32 is bonded at its inner circumferential surface to the outer circumferential surface of the small-diameter portion 40 of the fixing sleeve 38 while the elastic intermediate wall 34 is bonded at its inner circumferential surface to the outer circumferential surface of the large-diameter portion 42, during the vulcanization process.

An annular void is defined by and between the surfaces of the second elastic end wall 32 and the elastic intermediate wall 34 which are opposed to each other in the axial direction of the fixing sleeve 38. This annular void is divided by a pair of partition blocks 44, 44 (FIG. 3) into a first and a second pocket 52, 53 (FIG. 1). The two partition blocks 44 are formed as integral parts of the walls 32, 34, so as to extend these walls 32, 34 in the axial direction. The partition blocks 44 are opposed to each other in a diametric direction of the intermediate product 36. That is, the second elastic end wall 32, elastic intermediate wall 34 and partition blocks 44, 44 cooperate to constitute an integral elastic structure bonded to the fixing sleeve 38. Each of the first and second pockets 52, 53 extends in the circumferential direction of the intermediate product 36 over a circumferential length slightly smaller than a half of the entire circumference of the intermediate product 36, as indicated in FIG. 3. The first and second pockets 52, 53 are opposed to each other in a diametric direction perpendicular to the diametric direction in which the pair of partition rubber blocks 44, 44 are opposed to each other. The pockets 52, 53 are open in the outer circumferential surface of the intermediate product 36. According to this arrangement, the intermediate product 36 has a relatively low spring stiffness or a relatively soft spring characteristic in the diametric direction in which the first and second pockets 52, 53 are opposed to each other, and has a relatively high spring stiffness or a relatively hard spring characteristic in the diametric direction perpendicular to the diametric direction in which the pair of partition blocks 44, 44 are opposed to each other.

The first intermediate sleeve 46 indicated above is bonded by vulcanization to the outer circumferential surface of the intermediate product 36 including the integrally formed elastic walls 32, 34 and partition blocks 44, 44. This first intermediate sleeve 46 has a shoulder formed at an axially intermediate portion thereof, and includes a large-diameter portion 48 on the lower side of the shoulder and a small-diameter portion 50 on the upper side of the shoulder, as shown in FIGS. 1 and 2. The large-diameter portion 48 of the first intermediate sleeve 46 is bonded to the outer circumferential surface of the second elastic wall 32 while the small-diameter portion 50 is bonded to the outer circumferential surfaces of the elastic intermediate wall 34 and partition blocks 44, 44, during the vulcanization process in which the intermediate product 26 is prepared. The first intermediate sleeve 46 has a pair of windows 54, 54 which are opposed to each other in a diametric direction thereof, such that the windows 54, 54 are aligned with the first and second pockets 52, 53, respectively. The first and second pockets 52, 53 which are formed between the second elastic end wall 32 and the elastic intermediate wall 34 are open on the outer circumferential surface of the first intermediate sleeve 46 through the respective windows 54, 54. The intermediate product 36 consists of the fixing sleeve 38, the first intermediate sleeve 46, and the first elastic end wall 32 and elastic intermediate wall 34 which connect the sleeves 38, 46.

The thus constructed intermediate product 36 is fixedly attached to the inner sleeve 12, with the fixing sleeve 38 being press-fitted on the outer circumferential surface of the inner sleeve 12 such that the large-diameter portion 42 is located at an axially inner portion of the inner sleeve 12. The large-diameter portion 42 of the fixing sleeve 38 is secured to the inner sleeve 12 via the sealing rubber layer 28 as described above, so that the intermediate product 36 is fluid-tightly attached to the inner sleeve 12. In this arrangement, the elastic intermediate wall 34 is disposed in an axially spaced-apart relation with the first elastic end wall 26 with a suitable axial distance therebetween, to thereby define an annular void 56 between the intermediate wall 34 and the first end wall 26. Prior to the installation of an orifice member 58 which will be described, the annular void 56 is open at its outer circumference, between the second intermediate sleeve 22 and the small-diameter portion 50 of the first intermediate sleeve 46.

The intermediate product 36 is secured to the inner sleeve 12 with a predetermined relative positional relationship in the circumferential direction, such that the diametric direction in which the first and second pockets 52, 53 of the intermediate product 36 are opposed to each other coincides with the first diametric direction in which the pair of recesses 30, 30 of the first elastic end wall 26 are opposed to each each other. According to this arrangement, both of the first elastic end wall 26 and the intermediate product 36 have relatively low spring stiffness values in the first diametric direction and have relatively high spring stiffness values in the second diametric direction perpendicular to the first diametric direction.

On the outer circumferential surface of the small-diameter portion 50 of the first intermediate sleeve 46, there is fixed the above-indicated orifice member 58 which has a generally cylindrical shape. The orifice member 58 is sandwiched by and between the axially inner ends of the large-diameter portion 48 of the first intermediate sleeve 46 and the second intermediate sleeve 22, whereby the orifice member 58 is fixedly attached to the first and second intermediate sleeves 46, 22. As shown in FIGS. 4 through 7, the orifice member 58 consists of two semi-cylindrical orifice-defining members 60, 62. That is, the first semi-cylindrical orifice-defining member 60 and the second semi-cylindrical orifice-defining member 62 are fitted on the outer circumferential surface of the small-diameter portion 50 of the first intermediate sleeve 46 such that the first and second semi-cylindrical orifice-defining members 60, 62 are butted together at their circumferential end faces, such that the two members 60, 62 cooperate with each other to provide the cylindrical orifice member 58.

Figure 4:
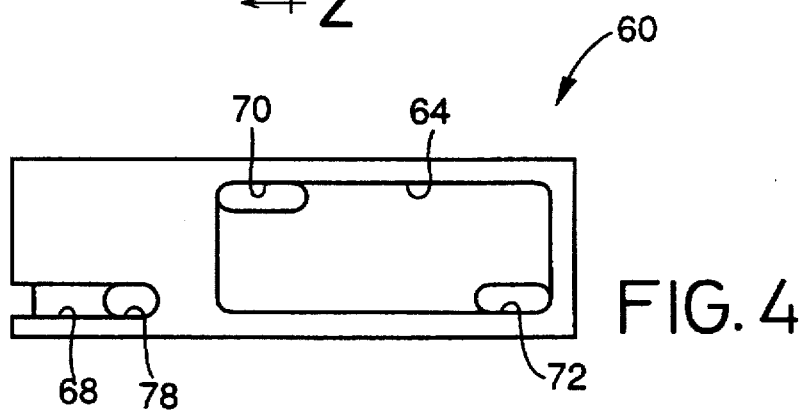
FIG. 4 is a plan view of a first semi-cylindrical orifice-defining member provided in the vehicle member mount of FIG. 1.
Figure 5:
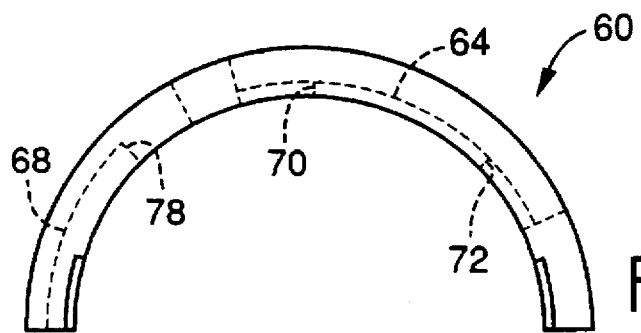
FIG. 5 is an elevational view of the first semi-cylindrical orifice-defining member of FIG. 4.
Figure 6:
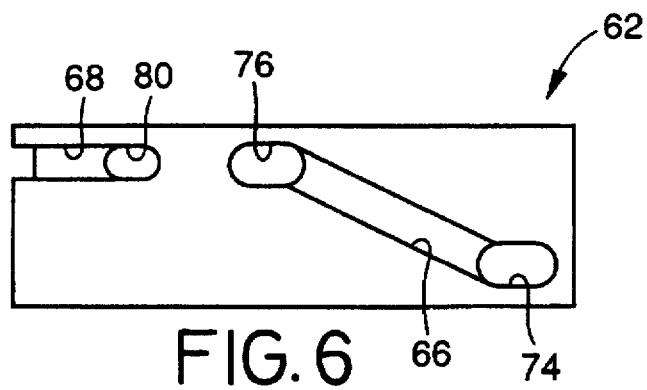
FIG. 6 is a plan view of a second semi-cylindrical orifice-defining member provided in the member mount of FIG. 1.
Figure 7:
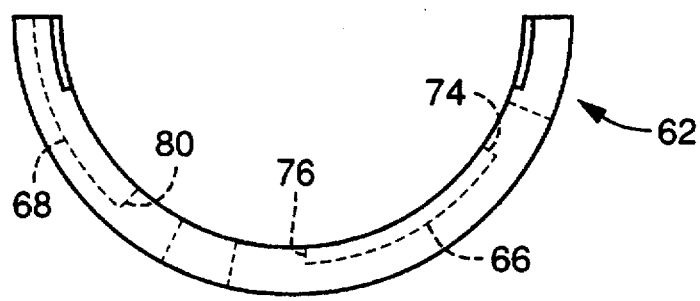
FIG. 7 is an elevational view of the second semi-cylindrical orifice-defining member of FIG. 6.

The first semi-cylindrical orifice defining-member 60 has a first groove 64 formed in its outer semi-cylindrical surface. This first groove 64 has a relatively large axial dimension, as shown in FIG. 4, and extends in the circumferential direction of the orifice member 58. The second semi-cylindrical orifice-defining member 62 has a second groove 66 formed in its outer semi-cylindrical surface. The second groove 66 extends generally in the circumferential direction of the orifice member 58 such that the second groove 66 is inclined by a suitable angle with respect to a plane perpendicular to the axis of the orifice member 58. The second groove 66 has a width considerably smaller than that of the first groove 64. The first and second orifice-defining members 60, 62 further have respective end grooves also formed in their outer semi-cylindrical surfaces. These end grooves cooperate to provide a third groove 68 which extends across the contacting circumferential end faces of the two orifice-defining members 60, 62. The first semi-cylindrical orifice-defining member 60 has two communication holes 70, 72, so that the first groove 64 communicates at one end thereof with the annular void 56 through the communication hole 70 and at the other end with the first pocket 52 through the communication hole 72. Similarly, the second semi-cylindrical orifice-defining member 62 has two communication holes 74, 76, so that the second groove 66 communicates at one circumferential end thereof with the annular void 56 through the communication hole 74 and at the other circumferential end with the second pocket 53 through the communication hole 76. The third groove 68 communicates at one end thereof with the first pocket 52 through a communication hole 78 formed through the first orifice-defining member 60, and the other end thereof with the second pocket 53 through a communication hole 80 formed through the second orifice-defining member 62.

The outer sleeve 14 is then fitted on the first and second intermediate sleeves 46, 22 with the first and second orifice-defining members 60, 62 attached thereto. The outer sleeve 14 is radially inwardly compressed onto the outer circumferential surfaces of the first and second intermediate sleeves 46, 22, by drawing the outer sleeve 14 with eight dies arranged around the outer sleeve 14. With the outer sleeve 14 being thus fitted on the first and second intermediate sleeves 46, 22 with the first and second orifice-defining members 60, 62 attached thereto, the opening of the annular void 56 and the openings of the windows 54, 54 of the first intermediate sleeve 46 (i.e., the openings of the first and second pockets 52, 53) are fluid-tightly closed by the outer sleeve 14. Accordingly, the member mount 10 which is thus produced has an annular first fluid chamber 82 corresponding to the annular void 56, and arcuate second and third fluid chamber 84, 86 corresponding to the respective first and second pockets 52, 53. The annular first fluid chamber 82 extends over the entire circumference of the inner sleeve 12, while the arcuate second and third fluid chambers 84, 86 extend in the circumferential direction of the inner sleeve 12, each over a circumferential length slightly smaller than a half of the entire circumference of the member mount 10. The second and third fluid chambers 84, 86 are opposed to each other in the first diametric direction identified above.

The first, second and third fluid chambers 82, 84, 86 are filled with a suitable non-compressible fluid such as alkylene glycol, polyalkylene glycol or silicone oil. For permitting the member mount 10 to exhibit a high damping effect on the basis of resonance of the non-compressible fluid, the non-compressible fluid is preferably a viscous fluid whose viscosity is 0.1 Pa.s or lower. The filling of these fluid chambers 82, 84, 86 with the selected fluid may be advantageously effected by mounting the outer sleeve 14 on the first and second intermediate sleeves 46, 22, within a mass of the selected fluid, so as to close the openings of the annular void 56 and the first and second pockets 52, 53.

The outer sleeve 14 thus mounted is held in contact with the outer circumferential surface of the cylindrical orifice member 58, whereby the first, second and third grooves 64, 66, 68 formed in the outer circumferential surface of the orifice member 58 are fluid-tightly closed by the outer sleeve 14, so as to provide a first, a second and a third orifice 88, 90, 92, respectively. Described more specifically, the first orifice 88 communicates with the first and second fluid chambers 82, 88 for permitting fluid flows therebetween. The second orifice 90 communicates with the first and third fluid chambers 82, 86 for permitting the fluid flows therebetween. The third orifice 92 communicates with the second and third fluid chambers 84, 86 for permitting the fluid flows therebetween.

The outer sleeve 14 has a thin sealing rubber layer 93 integrally formed on its inner circumferential surface by vulcanization. The sealing rubber layer 93 is compressed and held by and between the first and second intermediate sleeves 46, 22 and the outer sleeve 14, so as to assure the fluid-tightness of the first, second and third fluid chambers 82, 84, 86. The outer sleeve 14 further has a stop part 94 formed at one of its opposite axial ends on the side of the first intermediate sleeve 46. The stop part 94 extends in the radially inward direction. This stop part 94 is embedded in a buffer rubber block 96, which has a portion extending in the axially outward direction away from the stop part 94. The amount of relative displacement of the inner sleeve 12 and the outer sleeve 14 in the axial direction is restricted by abutting contact of the stop part 94 via the buffer rubber block 96 with a suitable member of the vehicle body (not shown) to which the inner sleeve 12 is secured.

Upon application of a vibrational load between the inner and outer sleeves 12, 14 of the thus constructed member mount 10 in its axial direction, the inner and outer sleeves 12, 14 are displaced relative to each other in the axial direction, so that the fluid pressures in the first and second fluid chambers 82, 84 and in the first and third fluid chambers 82, 86 are changed relative to each other due to elastic deformation of the first and second elastic end walls 26, 32 and the elastic intermediate wall 34. As a result, the non-compressible fluid is forced to flow between the first and second fluid chambers 82, 84 through the first orifice 88 and between the first and third fluid chambers 82, 86 through the second orifice 90. Accordingly, the member mount 10 exhibits a desired damping effect with respect to the vibration applied in its axial direction on the basis of the fluid flows through the first and second orifices 88, 90, respectively.

Upon application of a vibrational load between the inner and outer sleeves 12, 14 of the member mount 10 in the diametric direction in which the second and third fluid chambers 84, 86 are opposed to each other, the inner and outer cylindrical sleeves 12, 14 are displaced relative to each other in the radial direction, so that the fluid pressures in the second and third fluid chambers 84, 86 are changed relative to each other due to elastic deformation of the second axial end wall 32 and the intermediate wall 34, whereby the non-compressible fluid is caused to flow between the second and third fluid chambers 84, 86 through the third orifice 92. As a result, the member mount 10 exhibits a desired damping effect with respect to the vibration in its diametric or radial direction on the basis of the fluid flows through the third orifice 92.

In the present embodiment, the length and the cross sectional area of each of the orifices 88, 90, 92 are suitably determined or tuned so that the member mount 10 exhibits low spring constants over a wide range of frequency of the input vibration. More specifically described, the first orifice 88 is tuned so that the member mount 10 exhibits a low spring constant with respect to the vibrations in a frequency range of about 40–150 Hz based on resonance of the fluid flows through the first orifice 88. Similarly, the second orifice 90 is tuned to a frequency range of about 10–30 Hz while the third orifice 92 is tuned to a frequency range of about 20–80 Hz.

In the present embodiment, the first elastic end wall 26 is interposed between the flange member 20 attached to the inner sleeve 12 and the outward flange 24 of the second intermediate sleeve 22, which are opposed to each other in the axial direction of the member mount 10. The first elastic end wall 26 has tapered portions which are partially defined by the respective recesses 30, 30 as shown in FIG. 1. These tapered portions relatively easily undergo compressive and/or tensile deformation upon application of the axial vibrations to the member mount 10. This arrangement permits a relatively large amount of volumetric change (fluid pressure change) in the first fluid chamber 82, while at the same time, volumetric changes in the second and third fluid chambers 84, 86 are relatively easily permitted due to elastic deformation of the second elastic end wall 32 whose axial dimension is relatively small. Accordingly, upon application of the axial vibrations to the member mount 10, relative fluid pressure changes between the first and second fluid chambers 82, 84 and between the first and third fluid chambers 84, 86 are effectively caused, resulting in sufficient amounts of flow of the fluid through the first and second orifices 88, 90, respectively.

In the present embodiment, the radial length of the intermediate wall 34 (which corresponds to a radial distance between the large-diameter portion 42 of the fixing sleeve 38 and the small-diameter portion 50 of the first metal sleeve 46) is made smaller than the radial length of the first axial end wall 26 (which corresponds to a radial distance between the inner sleeve 12 and the second metal sleeve 22). In this arrangement, the amount of axial deformation of the diametrically opposite portions of the first axial end wall 26 other than the above-described circumferential tapered portions is made different from that of the intermediate wall 34 upon application of the axial vibrations to the member mount 10, so as to cause an effective volumetric change (fluid pressure change) in the first fluid chamber 82. Accordingly, the fluid pressure changes between the first and second fluid chambers 82, 84 and between the first and third fluid chambers 82, 86 are further effectively caused while permitting effective fluid flows through the first and second orifices 88, 90, respectively, whereby the member mount 10 is capable of exhibiting a further improved damping effect on the basis of resonance of the fluid flowing through these orifices 88, 90.

The first elastic end wall 26 of the present member mount 10 has the pair of recesses 30, 30 which are opposed to each other in the first diametric direction of the member mount 10. In this arrangement, the first elastic end wall 26 has a comparatively low spring stiffness in the first diametric direction in which the recesses are opposed to each other, and has a comparatively high spring stiffness in the second diametric direction which is perpendicular to the first diametric direction. Thus, the first elastic end wall 26 has a relatively large ratio of the spring stiffness values in the two mutually perpendicular diametric directions. On the other hand, the intermediate product 36 has the pair of partition blocks 44, 44 which are formed between the second elastic end wall 32 and the elastic intermediate wall 34 such that the two blocks 44 are opposed to each other in the above-indicated second diametric direction, so as to define the arcuate first and second pockets 52, 53 as described above. In this arrangement, the intermediate product 36 has a comparatively high spring stiffness in the second diametric direction in which the partition blocks 44, 44 are opposed to each other, and has a comparatively low spring stiffness in the first diametric direction in which the first and second pockets 52, 53 are opposed to each other. Thus, the intermediate product 36 also has a relatively large ratio of the spring stiffness values in the two mutually perpendicular diametric directions. Further, the intermediate product 36 is assembled with the inner sleeve 12 such that the two mutually perpendicular diametric directions in which the intermediate product 36 respectively has the high and low spring stiffness values coincide with those of the first elastic end wall 26. Namely, the first elastic end wall 26 and the intermediate product 36 have the comparatively high spring stiffness values in the second diametric direction and have the low spring stiffness values in the first diametric direction perpendicular to the second diametric direction. According to this arrangement, the present member mount 10 has a sufficiently large ratio of spring stiffness values in the mutually perpendicular first and second diametric directions. The member mount 10 is installed on the motor vehicle such that the second fluid chamber 84 and the third fluid chamber 86 are opposed to each other in the longitudinal or running direction of the vehicle so that the member mount 10 provides the low spring stiffness in the longitudinal direction of the vehicle and the high spring stiffness in the lateral or transverse direction of the vehicle, thereby ensuring improved steering or running stability of the vehicle while assuring enhanced driving comfort of the vehicle.

In the present member mount 10, the first elastic end wall 26 is prepared independently of the second elastic end wall 32 and the elastic intermediate wall 34, permitting easy molding thereof with the recesses 30, 30 which are open at one of the opposite axial ends. Further, the second elastic end wall 32 and elastic intermediate wall 34 are formed as an integral structure wherein the walls 32, 34 are connected to each other in the axial direction by the pair of partition blocks 44, 44, whereby the number of the required components of the member mount 10 is reduced, and the manufacturing and assembling efficiency of the member mount 10 are accordingly improved.

In the present member mount 10 wherein the second elastic end wall 32, elastic intermediate wall 34 and partition blocks 44, 44 constitute a one-piece elastic body, a high degree of fluid-tightness is secured between the second and third fluid chambers 84, 86, thereby preventing a variation in the damping characteristics of the member mount 10, which would otherwise be caused by an undesirable leakage flow of the fluid through the partition blocks 44, 44 between the two chambers 84, 86. Thus, the present member mount 10 exhibits the desired damping characteristic with high stability. Further, the integral or one-piece structure of the second elastic end wall 32, elastic intermediate wall 34 and partition blocks 44 completely prevents undesirable generation of abnormal noise which would arise from frictional contact of the partition blocks 44 with the second elastic end wall 32 and elastic intermediate wall 34.

While the fluid-filled damping device of the present invention has been described in its presently preferred embodiment for illustrative purpose only, it is to be understood that the invention is not limited to the details of the illustrated embodiment, but may be otherwise embodied.

For instance, the third orifice 92 for permitting fluid communication between the second and third fluid chambers 84, 86 is not essential for practicing the present embodiment. The third orifice 92 may be suitably employed depending upon the required damping characteristics of the fluid-filled damping device constructed according to the principle of the present invention. Further, the lengths and cross sectional areas of the first, second and third orifices 88, 90, 92 may be suitably changed so as to meet the desired damping characteristics of the fluid-filled damping device.

Figure 8:
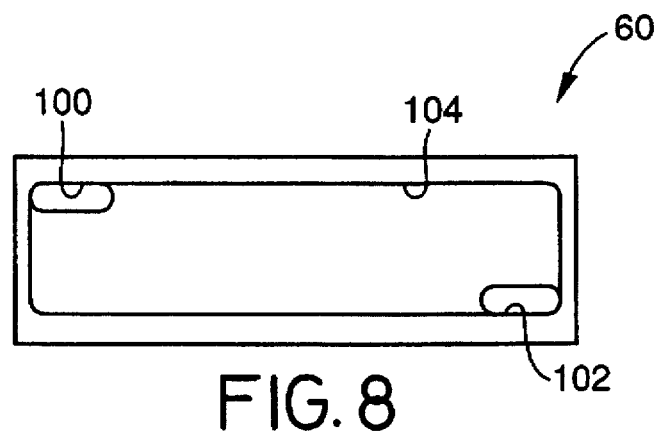
FIG. 8 is a plan view of the first semi-cylindrical orifice-defining member used in the member mount of FIG. 1, according to a second embodiment of the invention.
Figure 9:
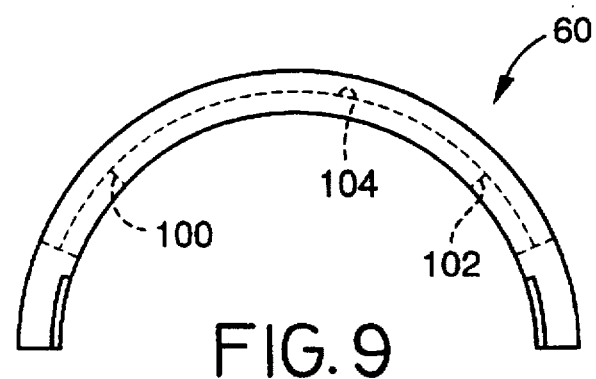
FIG. 9 is an elevational view of the first semi-cylindrical orifice-defining member of FIG. 8.
Figure 10:
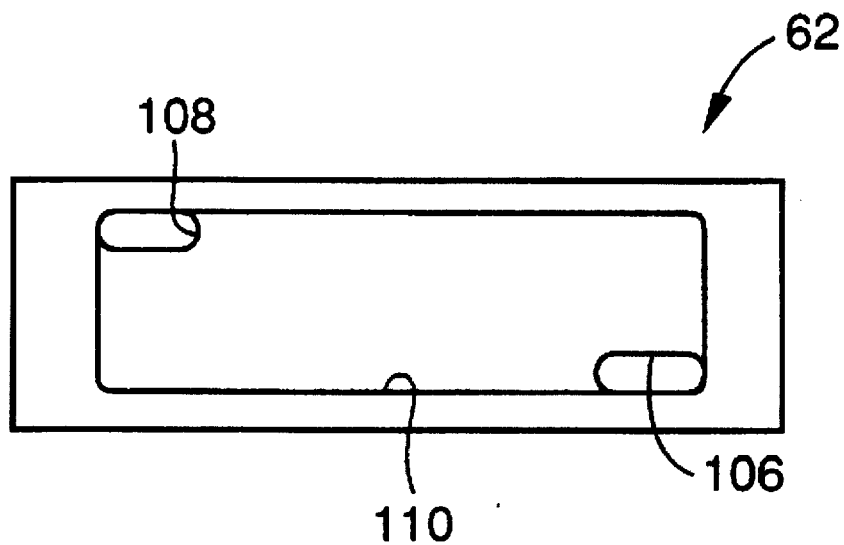
FIG. 10 is a plan view of the second semi-cylindrical orifice-defining member used in the member mount of FIG. 1, according to the second embodiment.
Figure 11:
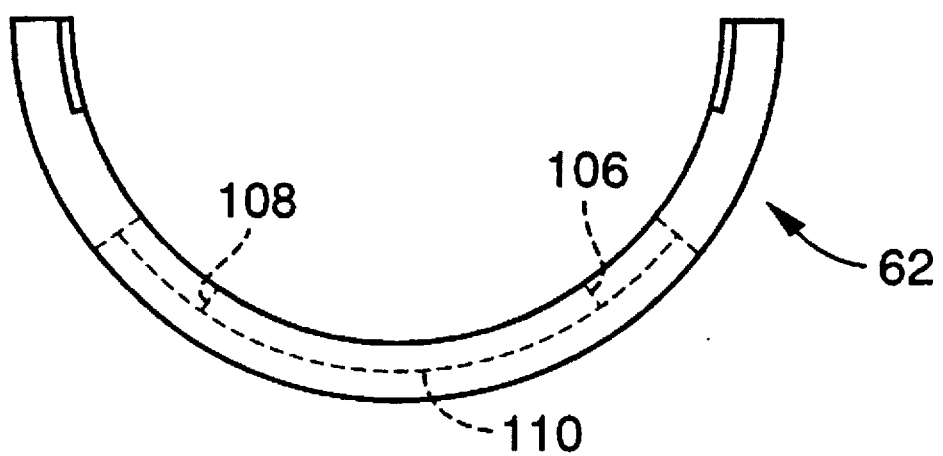
FIG. 11 is an elevational view of the second semi-cylindrical orifice-defining member of FIG. 10.

More specifically described by reference to FIGS. 8–11, the semi-cylindrical first orifice-defining member 60 may be provided with a first groove 104 which is formed over a suitable length in the outer circumferential surface and which communicates at one end thereof with the first fluid chamber 82 through a communication hole 100 and at the other end with the second fluid chamber 84 through a communication hole 102, as shown in FIGS. 8 and 9. Similarly, the semi-cylindrical second orifice-defining member 62 may be provided with a second groove 110 which is formed over a suitable length in the outer circumferential surface and which communicates at one end thereof with the first fluid chamber 82 through a communication hole 106 and at the other end with the third fluid chamber 86 through a communication hole 108, as shown in FIGS. 10 and 11. Thus, the fluid-filled damping device may be provided with only a first orifice for permitting fluid communication between the first and second fluid chambers 82, 84 and a second orifice for permitting fluid communication between the first and third fluid chambers 82, 86.

In the illustrated embodiments, the first orifice 88 and the second orifice 90 are tuned differently. However, these first and second orifices 88, 90 may have the same configuration depending upon the required damping characteristics of the fluid-filled damping support member.

Although the cylindrical orifice member 58 in the illustrated embodiments consists of the two semi-cylindrical orifice-defining members 60, 62, the orifice member 58 may be formed as a one-piece, cylindrical structure. In this case, the cylindrical orifice member is fitted on the small-diameter portion 50 of the first intermediate sleeve 46 in its axial direction.

The orifices are not limited to the details of the illustrated embodiments, but may be modified as needed. For instance, the orifices may be formed through the thickness of the elastic intermediate wall 34 in its axial direction. Alternatively, the orifices may be defined by and between the elastic intermediate wall 34 and an orifice member disposed in contact with the inner circumferential surface of the elastic intermediate wall 34.

In the illustrated embodiments, the first elastic end wall 26 was secured to the inner sleeve 12 by vulcanization of the rubber material. The first elastic end wall 26 may be otherwise secured to the inner sleeve 12. For instance, a metal sleeve is bonded by vulcanization to the inner circumferential surface of the first elastic end wall 26, and the metal sleeve is press-fitted on the inner sleeve 12, whereby the first axial elastic wall 26 is secured to the inner sleeve 12 via the metal sleeve. In this case, the second elastic end wall 32 and the elastic intermediate wall 34 are formed as an integral intermediate product, which is secured to the inner sleeve 12.

The second intermediate sleeve 22 bonded to the outer circumferential surface of the first elastic end wall 26 may have an increased axial length so that the sleeve 22 is fitted on the outer circumferential surface of the first intermediate sleeve 46. In this case, the outer sleeve 14 may be eliminated.

The flange member 20 attached to the inner sleeve 12 and the outward flange 24 of the second intermediate sleeve 22 are not essential when the expected input vibrations in the axial direction have a relatively small amplitude.

The second elastic end wall 32 need not have a smaller axial length than the first elastic end wall 26 for allowing easy elastic deformation thereof. The second elastic end wall 32 may have any configuration provided that the relative volumetric changes, i.e., fluid pressure differences between the first and second fluid chambers 82, 84 and between the first and third fluid chambers 82, 86 are induced upon application of the axial vibrations, due to different radial dimensions given to the first and second elastic end walls 26, 32 and the elastic intermediate wall 34, for instance.

While the illustrated embodiments of the fluid-filled damping device take the form of the member mount 10 for a motor vehicle, the principle of the invention is equally applicable to any other damping device such as a body mount or suspension bushing for a motor vehicle, which is adapted to exhibit a vibration damping effect based on resonance of the fluid upon application of the axial vibrations.

It is to be understood that the present invention may be embodied with various other changes, modifications and improvements, which may occur to those skilled in the art without departing from the spirit and scope of the invention defined in the following claims.

What is claimed is:

1. A fluid-filled damping device comprising:
    a center shaft member;
    an outer cylindrical member disposed radially outwardly of said center shaft member;
    a first and a second elastic end wall each having a generally annular shape, for elastically connecting said center shaft member and said outer cylindrical member at axially opposite end portions thereof, said first elastic end wall having a pair of recesses which are opposed to each other in a first diametric direction of said center shaft member;
    a generally annular elastic intermediate wall disposed between said first and second elastic end walls and cooperating with said first elastic end wall to define an annular void between said first elastic end wall and said elastic intermediate wall;

a pair of partition blocks which are disposed between said second elastic end wall and said elastic intermediate wall such that said partition blocks are opposed to each other in a second diametric direction perpendicular to said first diametric direction, said partition blocks cooperating with said second elastic end wall and said elastic intermediate wall to define a first pocket and a second pocket which are opposed to each other in said first diametric direction;

said elastic intermediate wall, said second elastic end wall and said partition blocks being formed as an integral structure separate from said first elastic end wall, said integral structure being secured at an inner circumferential surface thereof to said center shaft member;

a first intermediate sleeve fitted on an outer circumferential surface of said integral structure, said first intermediate sleeve having a pair of windows through which said first and second pockets are open;

said outer cylindrical member being fitted on said first intermediate sleeve such that said outer cylindrical member closes said annular void, thereby cooperating with said first elastic end wall to define a first fluid chamber, and also closes said pair of windows, thereby cooperating with said elastic intermediate wall, said second elastic end wall and said partition blocks to define a second and a third fluid chamber which correspond to said first and second pockets, respectively, said first, second and third fluid chambers being filled with a non-compressible fluid; and means for defining a first orifice for fluid communication between said first and second fluid chambers and a second orifice for fluid communication between said first and third fluid chambers.

2. A fluid-filled damping device according to claim 1, wherein said first intermediate sleeve has a shoulder formed at an axially intermediate portion thereof, and includes a large-diameter portion on one side of said shoulder and a small-diameter portion on the other side of said shoulder, said said large-diameter portion being fitted on an outer circumferential surface of said second elastic end wall while said small-diameter portion being fitted on an outer circumferential surface of said elastic intermediate wall.

3. A fluid-filled damping device according to claim 1, said elastic intermediate wall and said second elastic end wall are connected to each other in the axial direction at two diametrically opposite circumferential portions thereof by said pair of partition blocks so as to provide said integral structure.

4. A fluid-filled damping device according to claim 1, wherein said first elastic end wall is directly secured at its inner circumferential surface to said center shaft member, while said integral structure consisting of said elastic intermediate wall, said second elastic end wall and said partition blocks is secured to a fixing sleeve which is fitted on an outer circumferential surface of said center shaft member.

5. A fluid-filled damping device according to claim 4, wherein said fixing sleeve has a shoulder formed at an axially intermediate portion thereof, and includes a large-diameter portion on one side of said shoulder and a small-diameter portion on the other side side of said shoulder, said elastic intermediate wall being fixed to outer circumferential surface of said large-diameter portion while said second elastic end wall is fixed to an outer circumferential surface of said small-diameter portion.

6. A fluid-filled damping device according to claim 1, wherein said center shaft member has a sealing rubber layer formed on an outer circumferential surface thereof, said sealing rubber layer extending from a radially inner portion of said first elastic end wall in an axial direction of said center shaft member, so that said integral structure is fluid-tightly attached to said center shaft member via said sealing rubber layer.

7. A fluid-filled damping device according to claim 1, wherein said means for defining a first orifice and a second orifice comprises an annular orifice member disposed between said first intermediate sleeve and said outer cylindrical member, for defining said first and second orifices.

8. A fluid-filled damping device according to claim 7, wherein said orifice member consists of two semi-cylindrical orifice-defining members which are fitted on an outer circumferential surface of said small-diameter portion of said first intermediate sleeve such that said two semi-cylindrical orifice-defining members are butted together at opposite circumferential ends thereof.

9. A fluid-filled damping device according to claim 8, wherein said two semi-cylindrical orifice-defining members have a first and a second groove, respectively, which are formed on respective outer semi-cylindrical surfaces thereof, said first and second grooves being closed by said outer cylindrical member so as to provide said first and second orifices, respectively.

10. A fluid-filled damping device according to claim 8, further comprising means for defining a third orifice for fluid communication between said second and third fluid chambers.

11. A fluid-filled damping device according to claim 10, wherein said third orifice is defined by a third groove which is formed on the respective semi-cylindrical outer surfaces of said two semi-cylindrical orifice-defining members when said two members are butted together.

12. A fluid-filled damping device according to claim 1, further comprising a metal flange member attached to one of opposite axial ends of said center shaft member so as to extend radially outwardly of said center shaft member, and a second intermediate sleeve secured to an outer circumferential surface of said first elastic end wall and having an outward flange formed on one of opposite axial ends thereof so as to extend radially outwardly, said first elastic end wall being interposed between said flange member and said outward flange of said second intermediate sleeve as seen in an axial direction of the center shaft member, said second elastic end wall having a smaller axial length for permitting a larger amount of elastic deformation thereof in said axial direction than said first elastic end wall and said elastic intermediate wall.

13. A fluid-filled damping device according to claim 12, wherein said outer cylindrical member is fitted on an outer circumferential surface of said second intermediate sleeve.

14. A fluid-filled damping device according to claim 1, wherein said elastic intermediate wall has a radial dimension which is smaller than that of said first elastic end wall.

15. A fluid-filled damping device according to claim 1, wherein said outer cylindrical member has a stop part formed on one of opposite axial ends thereof remote from said first elastic end wall.

* * * * *